(12) United States Patent
Johnson et al.

(10) Patent No.: US 6,588,454 B1
(45) Date of Patent: Jul. 8, 2003

(54) PLUMBING SYSTEM TEST FITTING

(75) Inventors: Michael W. Johnson, Modesto, CA (US); Gregory L. Sesser, Modesto, CA (US); Richard E. Schaupp, Modesto, CA (US)

(73) Assignee: Plumb Rite, Inc., Modesto, CA (US)

( * ) Notice: Subject to any disclaimer, the term of this patent is extended or adjusted under 35 U.S.C. 154(b) by 0 days.

(21) Appl. No.: 10/027,999

(22) Filed: Dec. 19, 2001

(51) Int. Cl.[7] .............................. F16L 55/10; G01M 3/28
(52) U.S. Cl. ........................ 138/90; 138/89; 73/40.5 R
(58) Field of Search .................. 138/90, 89; 73/40.5 R, 73/49.5, 49.8

(56) References Cited

U.S. PATENT DOCUMENTS

| | | | |
|---|---|---|---|
| 4,542,642 A | 9/1985 | Tagliarino | 138/90 X |
| 4,602,504 A | 7/1986 | Barber | 138/89 X |
| 4,763,510 A * | 8/1988 | Palmer | 73/40.5 R |
| 4,932,241 A * | 6/1990 | Carmody et al. | 73/49.8 |
| 5,163,480 A | 11/1992 | Huber | 138/94 X |
| 5,507,501 A | 4/1996 | Palmer | 138/89 X |
| 6,032,515 A | 3/2000 | Huber | 138/90 X |
| 6,082,183 A * | 7/2000 | Huber | 73/49.1 |
| 6,209,584 B1 | 4/2001 | Huber | 138/89 |

* cited by examiner

*Primary Examiner*—Patrick Brinson
(74) *Attorney, Agent, or Firm*—Gardere Wynne Sewell LLP

(57) ABSTRACT

A plumbing test fitting for insertion in a plumbing drain or pressure fluid distribution system includes a body with two spaced-apart lateral ports formed thereon and opening into a central bore of the body. One of the ports is adapted for receiving a hose bib for connection to a source of test fluid and the other port is provided for withdrawing a flexible diaphragm from the interior of the body with a pull member extending through the other port. The flexible diaphragm is retained in the body during a pressure or leakage test of the plumbing system and is removed after completion of the test by tearing the diaphragm away from a supporting rim part. The flexible diaphragm is foldable to be withdrawn through the other port which may be of a diameter smaller than the normal unfolded diameter of the flexible diaphragm.

12 Claims, 3 Drawing Sheets

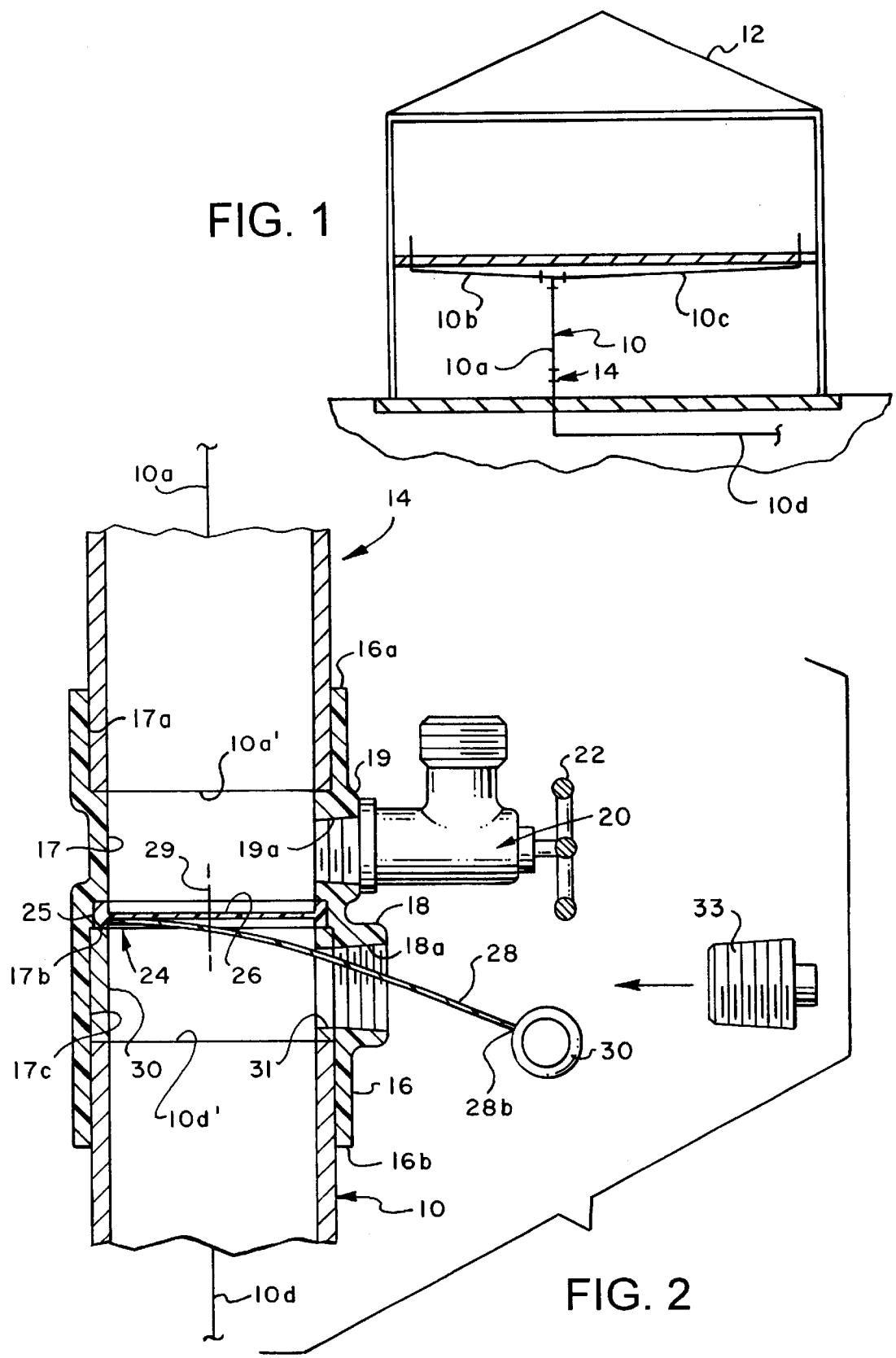

PLUMBING SYSTEM TEST FITTING

BACKGROUND OF THE INVENTION

In the installation and repair of various plumbing systems, it is usually necessary to pressure test the system for leaks before the system is placed in service or returned to service. In this regard, it is known to install in the plumbing system a test fitting which provides for introducing pressure water or the like into the system to pressure test the various fittings of the system for leakage.

Certain prior art types of test fittings are available which provide for filling and pressurizing the system upstream of the fitting using a so-called hose bib, faucet or valve connected to the fitting and connectable to a source of pressure water. Certain types of prior art fittings are also known which require relatively large and complicated structures and large ports for removing plugs, bladders or diaphragms of types which are substantially rigid or operable to be pressurized to block the plumbing system so that fluid may be introduced into the system for the leakage test. Releasing fluid to flow out of the plumbing system after the test is complete can be somewhat difficult with prior art systems and may result in the likelihood of fluid spillage before the port through which the rigid plug, diaphragm or bladder is removed can be closed.

Accordingly, there has been a need to provide an improved plumbing system test fitting of the general type discussed hereinabove. It is to these ends that the present invention has been developed.

BRIEF SUMMARY OF THE INVENTION

The present invention provides an improved test fitting for leakage testing of plumbing systems. In particular, the invention provides a test fitting which is inexpensive, relatively compact, is left intact as part of the plumbing system and which does not cause any restriction to fluid flow through the system nor add any substantial expense to the system.

In accordance with one aspect of the present invention, a plumbing system test fitting is provided which includes a body for receiving respective ends of plumbing conduits in sealed relationship therewith, the body including two spaced-apart, lateral, closable ports. One of the ports is adapted for connection to a faucet or so called hose bib for filling the plumbing system with fluid, usually water, and the other port is adapted for removal of a flexible, collapsible diaphragm which closes over a through passage or bore of the fitting and blocks the flow of fluid out of the system during leakage testing. The second port may be of relatively small diameter and is easily closeable with a small diameter threaded plug once the diaphragm has been removed. During installation of the test fitting, the diaphragm is placed within the fitting and is retained therein by a sleeve member. A generally flexible lanyard or pull member is attached at one end to the diaphragm, extends through the relatively small diameter lateral port and is preferably connected to a pull ring at its opposite end.

In accordance with further aspects of the present invention, several embodiments of flexible diaphragms are provided which are configured to be relatively easy to rupture when a lanyard or pull member is forcibly pulled to remove the diaphragm from the test fitting. However, the diaphragms are able to withstand substantial hydrostatic pressure to enable leakage testing of the plumbing system upstream of the fitting. Still further, the test fitting may be installed either horizontally, vertically or at any inclination needed for testing a plumbing system.

In accordance with yet a further aspect of the present invention, a plumbing system test fitting is provided which is configured such that, upon rupture of the flexible diaphragm and withdrawal of the diaphragm from the fitting, an insignificant amount of fluid at most is "spilled" through the lateral diaphragm exit port.

Those skilled in the art will further appreciate the above mentioned features and advantages of the plumbing system test fitting of the invention together with other important aspects thereof upon reading the detailed description which follows in conjunction with the drawings.

BRIEF DESCRIPTION OF THE SEVERAL VIEWS OF THE DRAWINGS

FIG. 1 is a somewhat simplified schematic view of a typical plumbing system including the test fitting of the present invention disposed therein;

FIG. 2 is a longitudinal central section view of the plumbing system test fitting of the present invention;

DETAILED DESCRIPTION OF THE PREFERRED EMBODIMENTS

Figure 3:
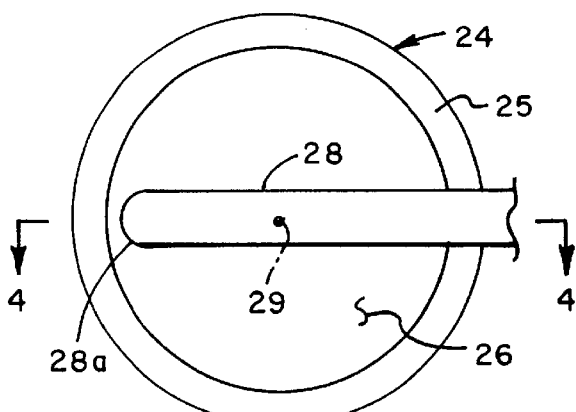
FIG. 3 is a plan view of one preferred embodiment of a diaphragm for the test fitting of the present invention.

In the description which follows, like parts are marked throughout the specification and drawings with the same reference numerals, respectively. The drawing figures are not necessarily to scale and certain features may be shown in somewhat generalized or schematic form in the interest of clarity and conciseness.

Referring to FIG. 1, there is illustrated a plumbing system 10 including a vertically extending drain conduit section 10a connected to feeder or branch drain conduits 10b and 10c. A test fitting 14 in accordance with the invention is shown disposed in vertical conduit section 10a, but could be disposed in a horizontal orientation in conduit 10d also. Plumbing system 10 is disposed in a multi-story structure 12, as shown in FIG. 1. Test fitting 14 is typically used in drainage plumbing systems, although a test fitting in accordance with the present invention may also be utilized on pressure or supply plumbing systems to leakage test same.

Referring now to FIG. 2, test fitting 14 comprises an elongated, generally cylindrical tubular body 16 having a first end 16a and a second end 16b. A cylindrical bore 17 extends within body 16 and includes a first enlarged counterbore 17a opening to end 16a, a short intermediate counterbore 17b and a third enlarged counterbore 17c opening to the end 16b.

A first, integral, laterally extending boss 18 is formed on body 16 spaced from a second, integral, laterally extending boss 19. Boss 18 is provided with an internally threaded port 18a and boss 19 is also provided with an internally threaded port 19a, the ports 18a and 19a opening into the bores 17c and 17, respectively, as shown in FIG. 2. A so-called hose bib or faucet 20 is threadedly connected to boss 19 and is operable to be connected to a conduit, not shown, for supplying test fluids, such as water, to the interior of the plumbing system to which the fitting 14 is connected. Faucet 20 includes a manual operating handle 22 for opening and closing a closure member, not shown, of the faucet 20.

Figure 4:
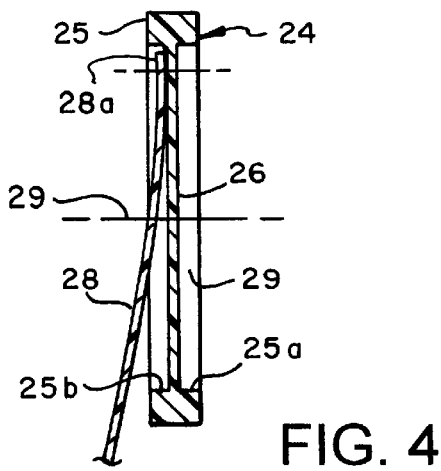
FIG. 4 is a section view taken along the line 4—4 of FIG. 3.

Referring further to FIG. 2, the fitting 14 includes a diaphragm assembly 24 including a generally cylindrical rim part 25, dimensioned to be a snug fit within counterbore 17b, and a relatively thin, flexible, rupturable diaphragm part 26. Referring briefly to FIGS. 3 and 4, rim part 25 is delimited by opposed cylindrical recesses 25a and 25b, see FIG. 4, whereby relatively thin circular diaphragm part 26 delimits the opposed recesses. Diaphragm assembly 24 may be suitably molded of a polymer material, such as polyethylene, polyvinylchloride, or similar polymers and providing the diaphragm 26 to be substantially flexible.

As shown in FIGS. 2, 3 and 4, diaphragm 26 is connected to a pull member or lanyard 28 comprising a somewhat flexible strap-like member which may integrally joined to the diaphragm at one end 28a, chemically bonded thereto, or secured thereto by a mechanical fastener, not shown. In a preferred embodiment, the pull member 28 is secured to the diaphragm 26 near the juncture of the diaphragm with the rim part 25 and offset from the central axis 29 of the diaphragm assembly 24. Axis 29 is coincident with the central axis of bores 17, 17a, 17b and 17c when diaphragm assembly 24 is disposed in body 16, as shown in FIG. 2. The opposite end 28b, FIG. 2, of pull member 28 is preferably connected to a suitable pull ring 30 or other member which may be easily grasped to pull the diaphragm 26, at will, so that the diaphragm will tear away from the rim part 25 at its juncture therewith. In this regard, the diaphragm 26 may be of sufficient thickness relative to the rim part 25 as to easily rupture at its juncture therewith. Alternatively, the diaphragm 26 may be scored or provided with suitable rupture lines or reduced wall thickness at its juncture with rim part 25, or provided as described in conjunction with alternate embodiments herein.

When the diaphragm assembly 24 is placed in the counterbore 17b, pull member 28 and the pull ring 30 are first inserted through the bore 17c and then through port 18a to the exterior of the fitting 14 as the diaphragm assembly is placed within the bore 17b. The diaphragm assembly 24 is retained in the bore 17b by a tubular sleeve part 30 which may be secured in bore 17c and is provided with a radially extending port 31 aligned with the port 18a. The sleeve part 30 may be secured in the bore 17c in any suitable manner including being retained therein by the distal end 10d' of conduit 10d, FIG. 2, which is insertable within the bore 17c. Conduit end 10a' is also, as shown in FIG. 2, insertable in bore 17a and may be secured therein in any manner associated with conventional piping systems. For example, if the fitting 14 is adapted for use with polyvinylchloride (PVC) piping, the conduit ends 10a' and 10d' may be suitably adhesively secured to the body 16. Alternatively, the bores 17c and 17a may be threaded for receiving correspondingly threaded pipe members comprising the conduit members 10a and 10d, as shown in FIG. 2.

The test fitting 14 enjoys several advantages in the art of plumbing system test fittings. The diameter threaded port 18a may be made substantially smaller than the diameter of the diaphragm 26, as well as ports provided in prior art plumbing test fittings, and is preferably disposed relatively closely adjacent to the bore 17b which supports the diaphragm assembly 24. Accordingly, when the plumbing system 10 has been filled with liquid via the hose bib or faucet 20 so that liquid resides in the drainage piping 10a, 10b and 10c, a certain hydrostatic pressure head exists at the diaphragm part 26. The diaphragm part 26 is of sufficient strength to withstand at least a predetermined hydrostatic pressure head suitable for testing the plumbing system 10. Once the plumbing system 10 has been tested and found suitable, or otherwise, water used for the hydrostatic test may be drained through port 19a and hose bib 20. Alternatively, such water may be released to flow out of the system through conduit 10d by pulling firmly on the pull member 28 to rupture the diaphragm assembly 24, tearing the diaphragm part 26 away from the rim part 25 at its juncture therewith and pulling the diaphragm out through the port 18a. Initially, the diaphragm part 26 will tend to tear away from the rim part 25 at the point of connection of the pull member 28 with the diaphragm, whereby as the diaphragm part is pulled downwardly and laterally, viewing FIG. 2, it will tend to cover the ports 31 and 18a to prevent fluid that has been released to flow through the conduit 10d to not splash out through the relatively small diameter port 18a.

Once the fluid has drained away, the pull member 28 may be again pulled firmly to tear the diaphragm part 26 completely away from the rim 25 and out through the reduced diameter port 18a. Thanks to the flexibility of the diaphragm 26, it may be easily folded or deformed, as required, to extract it through the ports 31 and 18a whereby the port 18a may then be closed with a conventional externally threaded pipe plug 33, FIG. 2, and the plumbing system 10 is then ready for use. The hose bib 20 may be left in place or replaced by a similar plug threadedly joined to the body 16 at the port 19a.

Accordingly, the configuration of the diaphragm assembly 24 and the body 16 is such that minimal spillage of test liquid occurs, if such test liquid is not drained through hose bib 20, when the diaphragm part 26 is ruptured and pulled out of the fitting through the port 18a. Moreover, as previously mentioned, by providing the diaphragm assembly 24 of a molded polymer material, whereby the diaphragm 26 is relatively thin, and joined about its periphery to the rim part 25, the diaphragm 26 exhibits sufficient strength to pressure test the plumbing system, but may also be easily torn away from rim part 25 at its juncture therewith, pulled intact out of the body 16 through the port 18a and discarded. The fitting 14 may, if desired, be reused by inserting a new diaphragm assembly 24 in the bore 17b in place of the diaphragm assembly which has been ruptured.

Figure 5:
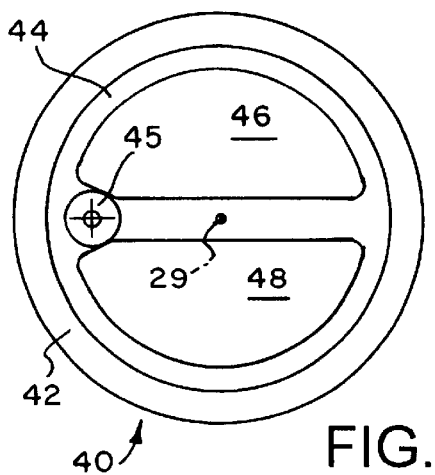
FIG. 5 is a plan view of a first alternate embodiment of a diaphragm for the test fitting of the invention.

Looking now at FIG. 5, a first alternate embodiment of diaphragm assembly in accordance with the invention is illustrated and generally designated by numeral 40. Diaphragm assembly 40 includes a peripheral rim part 42 similar to the rim part 25 and a relatively thin circular diaphragm part 44, preferably integrally joined with the rim part in the same manner as for the diaphragm assembly 24. FIG. 5 illustrates a connection part 45 for connecting a pull member, not shown, such as the pull member 28, to a relatively thin diaphragm comprising opposed, generally semi-circular parts 46 and 48. In response to a pulling effort on the connection part 45 by the aforementioned pull member, diaphragm parts 46 and 48 may be torn away from the rim 42 to form a substantial opening through a fitting in which the diaphragm assembly 40 has been installed.

Figure 6:
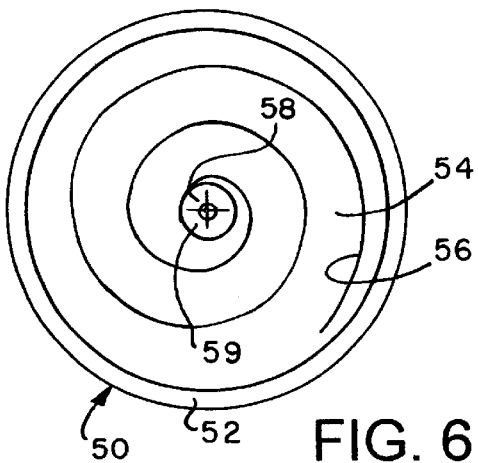
FIG. 6 is a plan view of a second alternate embodiment of a diaphragm for the test fitting.

Referring to FIG. 6, another embodiment of a diaphragm assembly for use with test fitting 14 is illustrated and generally designated by the numeral 50. Diaphragm assembly 50 includes a relatively rigid peripheral rim part 52 and a flexible, thin, circular disc diaphragm part 54 configured in transverse section view to be similar to diaphragm 26. However, diaphragm 54 includes a spiral score or tear line 56 extending substantially from the rim part 52 to a centrally disposed connection part 58 to which a pull member, not shown, may be attached. Connection part 58 is substantially centered along the central axis 59 of diaphragm assembly 50. A pulling action on part 58 by the aforementioned pull member will cause separation and rupture of the diaphragm along the score line 56 to substantially remove the diaphragm 54 from the rim part 52 by a firm pulling action. The configuration of the diaphragm 54 lends itself to causing it to be reconfigured as a relatively long, thin strip as the diaphragm ruptures along the line 56 to further facilitate pulling the flexible diaphragm completely free of rim part 52 and through a lateral port in the main body of the fitting, such as the port 18a. In this way, the port 18 can be made even smaller than that required for extracting diaphragms, such as the diaphragms 26 and 46, 48.

Figure 7:
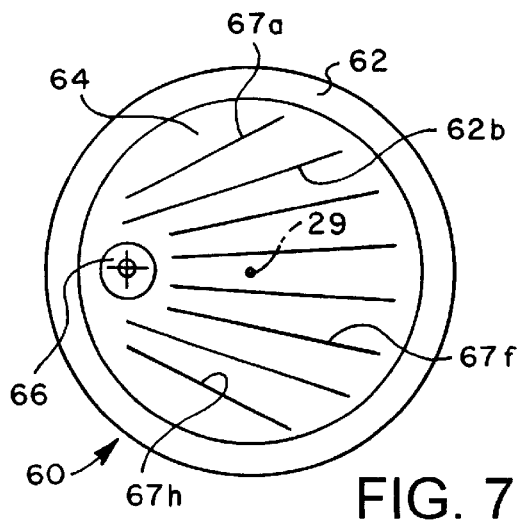
FIG. 7 is a plan view of a third alternate embodiment of a diaphragm for the test fitting.

Referring to FIG. 7, a further modified diaphragm assembly 60 includes a circular rim part 62 and a flexible, thin circular disc diaphragm part 64 joined to the rim part in substantially the same manner as the arrangement of FIGS. 3 and 4. A laterally offset connection part 66 is secured to the diaphragm part 64 and a plurality of diverging score lines 67a through 67h are shown radiating from the connection part. Accordingly, with a pull member, not shown, attached to the diaphragm 64 at the connection part 66, the diaphragm 64 will rupture when pulled at the juncture of the diaphragm with the rim 62 and also along the score or tear lines 67a through 67h to facilitate withdrawal of the diaphragm through a relatively small diameter exit port, such as the port 18a. In this way, the diaphragm part 64 may be made relatively thicker than the diaphragm part 26 to withstand higher pressures while also being easily foldable to be extracted from a relatively small diameter exit port.

Figure 8:
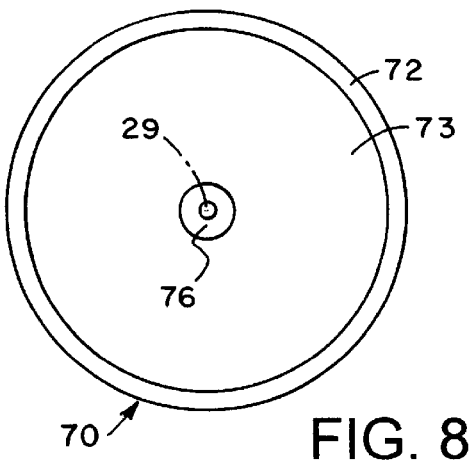
FIG. 8 is a plan view of a fourth alternate embodiment of a diaphragm for the test fitting of the present invention.

Referring to FIG. 8, another embodiment of a diaphragm assembly in accordance with the invention is illustrated and generally designated by the numeral 70. The diaphragm 70 has a peripheral rim part 72 similar to the rim 25 and a relatively thin circular disc diaphragm part 73 formed integral with the rim part 72, and in generally the same manner as the diaphragm 24 assembly. However, the diaphragm assembly 70 includes a central connection part 76 which is substantially coincident with a central axis 29 of the diaphragm and which is also the central axis of the body 16. The diaphragm member 73 is also sufficiently flexible when torn away from the rim part 72 to be extracted through the port 18a.

Figure 9:
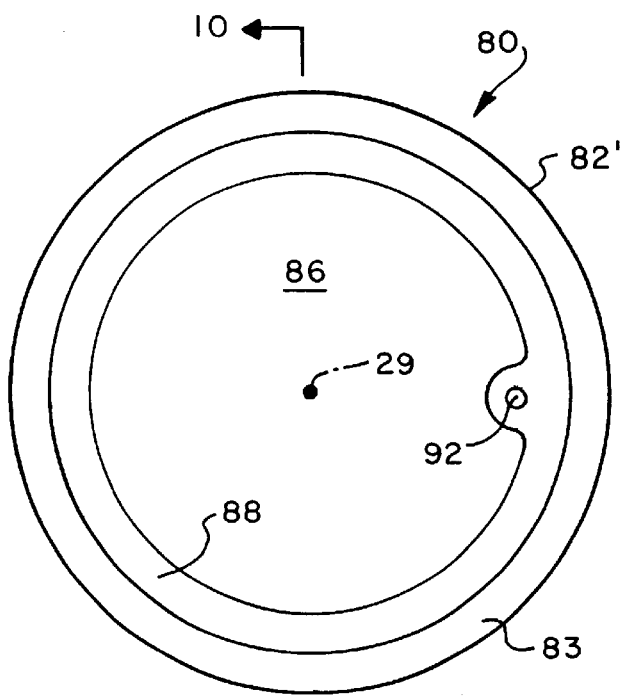
FIG. 9 is a plan view of a fifth alternate embodiment of a diaphragm for the test fitting of the present invention.
Figure 10:
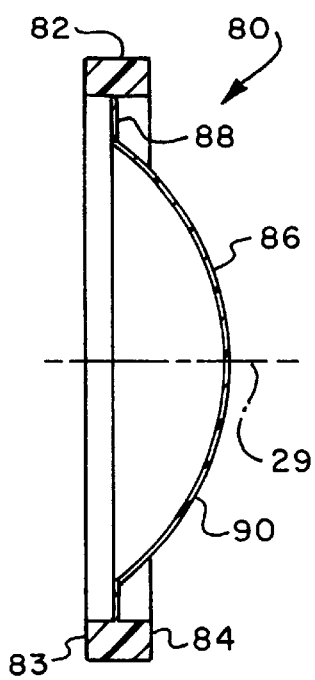
FIG. 10 is a section view taken generally along the line 10—10 of FIG. 9.
Figure 11:
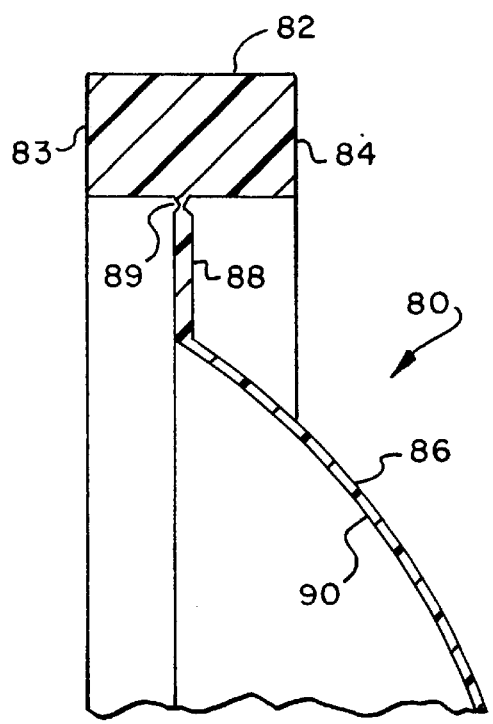
FIG. 11 is a detail section view similar to FIG. 10 on a larger scale.

Referring now to FIGS. 9 through 11, still another preferred embodiment of a diaphragm assembly in accordance with the invention is illustrated and generally designated by the numeral 80. The diaphragm assembly 80 includes a cylindrical peripheral rim part 82 similar to the rim part 25 including opposed transverse faces 83 and 84. The rim part 82 is integrally joined to a generally hemispherical or dome shaped diaphragm part 86 having a generally cylindrical annular disk portion 88 joined to the rim part 82 at a relatively thin cylindrical tear line 89, see FIG. 11, and integrally joined to a generally hemispherical dome portion 90. As shown in FIG. 9 the diaphragm assembly 80 also includes a radially offset connection part 92 for connecting the diaphragm part 86 to the lanyard or pull member 28, for example.

The diaphragm assembly 80 may be fabricated of the same materials as mentioned previously for the diaphragm assembly 24, for example, and is preferably installed in the fitting 14 in place of the diaphragm assembly 24 with the hemispherical portion 90 extending toward the conduit section 10a so that test fluid in the system acts on the diaphragm in such a way that the hemispherical portion 90 is stressed generally in compression. However, if there is a sufficient static pressure head to force the flexible hemispherical portion 90 to invert and face in the other direction, thereby placing the diaphragm part 86 substantially in tension, the diaphragm assembly 80 may still operate satisfactorily. In fact, the diaphragm assembly 80 may be initially installed in the fitting 14 with the hemispherical or dome shaped diaphragm part 86 facing in the opposite direction or toward the conduit 10d, if desired.

The construction and operation of the test fitting 14 is believed to be understandable to those skilled in the art based on the foregoing description. The components of the test fitting 14, including the body 16 and the sleeve 30 may be formed of one of a variety of materials including polyvinylchloride, cast iron, steel, or other materials normally used for plumbing fittings. As mentioned previously, the diaphragm assembly 24 as well as the diaphragm assemblies 40, 50, 60, 70 and 80, may be formed of molded polyethylene, polyvinylchloride or other flexible polymer material with sufficient strength to withstand the test pressures that the fitting will be subjected to, but also constructed such that the diaphragm members or parts 26, 46, 48, 54, 64, 73 and 86 may be easily torn away from their respective rim parts when it is desired to unblock a plumbing system in which the fitting 14 is disposed.

Although preferred embodiments of the present invention have been described in detail herein, those skilled in the art will recognize that various substitutions and modifications may be made without departing from the scope and spirit of the appended claims.

What is claimed is:

1. A test fitting for testing a plumbing system, said fitting comprising:
   a body including a bore formed therein and defining a flow passage, said body being adapted to be connected to a conduit at opposite ends of said body for insertion in a plumbing system, said body including a first lateral port opening into said bore and a second lateral port spaced from said first lateral port for connecting said body to a source of test fluid for testing said plumbing system; and
   a flexible molded polymer diaphragm assembly disposed in said bore in a position between said lateral ports and whereby said second lateral port is disposed between said plumbing system and said diaphragm assembly, said diaphragm assembly being connected to a pull member extending through said first lateral port, said diaphragm assembly including a peripheral rim part adapted to be retained in said bore and a generally circular thin walled diaphragm part joined to said rim part, the diameter of said diaphragm part being greater than the diameter of said first lateral port, said diaphragm part being connected to said pull member and responsive to a pulling action on said pull member to be separated from said rim part and extracted from said bore through said first lateral port.

2. The test fitting set forth in claim 1 including:
   a spiral tear line formed on said diaphragm part and extending from a point of attachment of said pull member to said diaphragm part toward said rim part.

3. The test fitting set forth in claim 1 wherein:
said pull member is attached to said diaphragm part at a laterally displaced position with respect to a central axis of said diaphragm assembly.

4. A test fitting for testing a plumbing system, said fitting comprising:
a body including a bore formed therein and defining a flow passage, said body being adapted to be connected to a conduit at opposite ends of said body for insertion in a plumbing system and said body including a first lateral port opening into said bore; and
a diaphragm assembly disposed in said bore and including a pull member extending through said first lateral port, said diaphragm assembly including a flexible diaphragm part connected to said pull member and responsive to a pulling action on said pull member to be extracted from said bore through said first lateral port, said diaphragm assembly including a peripheral rim part operable to be retained in said bore and said diaphragm part comprises a generally hemispherical shaped portion joined to said rim part at a tear line for tearing said diaphragm part away from said rim part at will.

5. A test fitting for testing a plumbing system, said fitting comprising:
a body including a bore formed therein and defining a flow passage, said body being adapted to be connected to a conduit at opposite ends of said body for insertion in a plumbing system and said body including a first lateral port opening into said bore;
a diaphragm assembly disposed in said bore and including a pull member extending through said first lateral port, said diaphragm assembly including a flexible diaphragm part connected to said pull member and responsive to a pulling action on said pull member to be extracted from said bore through said first lateral port; and
a retaining sleeve insertable in said bore for retaining said diaphragm assembly in said body.

6. A test fitting for testing a plumbing system, said fitting comprising:
a body including a bore formed therein and defining a flow passage, said body being adapted to be connected to a conduit at opposite ends of said body for insertion in a plumbing system, said body including a first lateral port opening into said bore and a second lateral port spaced from said first lateral port for connecting said body to a source of test fluid for said plumbing system; and
a diaphragm assembly disposed in a counterbore formed in said body between said first and second lateral ports and including a pull member extending through said first lateral port, said diaphragm assembly including a flexible diaphragm part connected to said pull member and responsive to a pulling action on said pull member to be extracted from said bore through said first lateral port.

7. A test fitting for testing a plumbing system, said fitting comprising:
a body including a bore formed therein and defining a flow passage, said body being adapted to be connected to a conduit at opposite ends of said body for insertion in a plumbing system and said body including a first lateral port opening into said bore; and
a diaphragm assembly disposed in said bore and including a pull member extending through said first lateral port, said diaphragm assembly including a generally cylindrical rim part and a generally circular flexible diaphragm part joined to and supported by said rim part and connected to said pull member, said diaphragm part including a plurality of substantially side-by-side tear lines extending across said diaphragm part and radiating generally from a point of connection of said pull member to said diaphragm part and forming a line of separation of said diaphragm part from one of itself and said rim part and responsive to a pulling action on said pull member to be extracted from said bore through said first lateral port.

8. A test fitting for testing a plumbing system, said fitting comprising:
a body including a bore formed therein and defining a flow passage, said body being adapted to be connected to a conduit at opposite ends of said body for insertion in a plumbing system, said body including a first lateral port opening into said bore and a second lateral port spaced from said first lateral port for connecting said body to a source of test fluid for said plumbing system;
a flexible molded polymer diaphragm assembly disposed in said bore and including a pull member extending through said first lateral port, said diaphragm assembly including a peripheral rim part adapted to be retained in said bore and a generally circular thin walled diaphragm part joined to said rim part, the diameter of said diaphragm part being greater than the diameter of said first lateral port, said diaphragm part being connected to said pull member and responsive to a pulling action on said pull member to be separated from said rim part and extracted from said bore through said first lateral port; and
a retaining sleeve insertable in said bore for retaining said diaphragm assembly in said body.

9. A test fitting for testing a plumbing system, said fitting comprising:
a body including a bore formed therein and defining a flow passage, said body being adapted to be connected to a conduit at opposite ends of said body for insertion in a plumbing system, said body including a first lateral port opening into said bore and a second lateral port spaced from said first lateral port for connecting said body to a source of test fluid for said plumbing system; and
a flexible molded polymer diaphragm assembly disposed in said bore and including a pull member extending through said first lateral port, said diaphragm assembly including a peripheral rim part adapted to be retained in said bore and a generally circular thin walled diaphragm part including a generally hemispherical shaped portion joined to said rim part at a tear line for tearing said diaphragm part away from said rim part at will, the diameter of said diaphragm part being greater than the diameter of said first lateral port, said diaphragm part being connected to said pull member and responsive to a pulling action on said pull member to be separated from said rim part and extracted from said bore through said first lateral port.

10. The test fitting set forth in claim 9 wherein:
said diaphragm assembly is disposed in a counterbore formed in said body, said counterbore being disposed between said first and second lateral ports.

11. The test fitting set forth in claim 9 wherein:
said diaphragm part is of sufficient flexibility to be foldable to be extracted from said body through said first lateral port.

12. A test fitting for testing a plumbing system, said fitting comprising:
- a body including a bore formed therein and defining a flow passage, said body being adapted to be connected to a conduit at opposite ends of said body for insertion in a plumbing system, said body including a first lateral port opening into said bore and a second lateral port spaced from said first lateral port for connecting said body to a source of test fluid for said plumbing system; and
- a flexible molded polymer diaphragm assembly disposed in said bore and including a pull member extending through said first lateral port, said diaphragm assembly including a peripheral rim part adapted to be retained in said bore and a generally circular thin walled diaphragm part joined to said rim part, the diameter of said diaphragm part being greater than the diameter of said first lateral port, said diaphragm part being connected to said pull member and responsive to a pulling action on said pull member to be separated from said rim part and extracted from said bore through said first lateral port, said diaphragm part including at least one tear line forming a line of separation of said diaphragm part from said rim part whereby said diaphragm part may be separated into a member having one of a predetermined maximum width dimension and a folded dimension less than the diameter of said first lateral port.

* * * * *